(12) United States Patent
Golwalkar

(10) Patent No.: US 9,819,669 B1
(45) Date of Patent: Nov. 14, 2017

(54) IDENTITY MIGRATION BETWEEN ORGANIZATIONS

(71) Applicant: Amazon Technologies, Inc., Seattle, WA (US)

(72) Inventor: Yogesh Vilas Golwalkar, Andhara Pradesh (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/750,173

(22) Filed: Jun. 25, 2015

(51) Int. Cl.
*H04L 29/06* (2006.01)

(52) U.S. Cl.
CPC ...... *H04L 63/0815* (2013.01); *H04L 63/0218* (2013.01); *H04L 63/0853* (2013.01)

(58) Field of Classification Search
CPC ...... G06F 17/303; G06F 3/0647; G06F 3/065; G06F 9/5088; G06F 17/30079; G06F 17/30575; H04L 67/1095
See application file for complete search history.

(56) References Cited

U.S. PATENT DOCUMENTS

| | | | | |
|---|---|---|---|---|
| 6,757,696 B2 * | 6/2004 | Multer | ............ | G06F 17/30194 |
| 2005/0193181 A1 * | 9/2005 | Kaneda | ............ | G06F 3/0622 711/162 |
| 2006/0085607 A1 * | 4/2006 | Haruma | ............ | G06F 3/0607 711/161 |
| 2007/0083917 A1 * | 4/2007 | Peterson | ............ | G06F 21/31 726/5 |
| 2007/0150595 A1 * | 6/2007 | Bhorania | ............ | H04L 67/325 709/226 |
| 2008/0104250 A1 * | 5/2008 | Vanyukhin | ............ | G06F 17/303 709/226 |
| 2008/0133533 A1 * | 6/2008 | Ganugapati | ............ | G06F 21/45 |
| 2010/0023980 A1 * | 1/2010 | Yamagishi | ............ | G06Q 30/02 725/104 |
| 2013/0007866 A1 * | 1/2013 | Crume | ............ | H04L 9/3226 726/7 |
| 2015/0142650 A1 * | 5/2015 | Johnston | ............ | G06Q 40/02 705/41 |
| 2016/0105321 A1 * | 4/2016 | Thakkar | ............ | H04L 41/0853 709/220 |
| 2016/0164722 A1 * | 6/2016 | Zhu | ............ | H04L 41/082 709/221 |

* cited by examiner

*Primary Examiner* — Khang Do
(74) *Attorney, Agent, or Firm* — Thomas Horstemeyer, LLP

(57) ABSTRACT

Disclosed are various embodiments for identity data migration from one organization to another. Identity data corresponding to user accounts of a first organization are copied from a first data store managed by the first organization to a second data store managed by a second organization. A sign-in process of a network site of the first organization is reconfigured to employ an authentication service operated by the second organization. The authentication service is configured to authenticate a user of the network site using the identity data stored in the second data store.

18 Claims, 6 Drawing Sheets

US 9,819,669 B1

IDENTITY MIGRATION BETWEEN ORGANIZATIONS

BACKGROUND

Organizations, such as electronic commerce retailers, are often acquired by other organizations. For instance, an online retailer may specialize in selling footwear and may gain significant market segment share in that arena. Later, a larger generalized online retailer may acquire the footwear-specific retailer. At the time of acquisition, the two retailers may operate entirely separate computing systems and network infrastructure. Thus, customers of the two retailers may have separate accounts for each retailer.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to migrating user identities between organizations, such as the case in which one organization acquires another. At the time of acquisition, the two organizations may be operating entirely distinct systems, such that users would require a separate account for each organization. Creating each account may involve a distinct enrollment process, where a user provides a username, a password, contact information, and other information. The information collected may differ among the two organizations, and the specifications of the same type of information may also differ. For example, one organization may require that a user have a password of at least six characters, while another organization may require that a user have a password of at least eight characters. Different security policies and configurations may be employed to manage user identities, which is understandable given that the organizations may have entirely different information technology leadership and staff.

Upon acquisition, the acquired organization may continue to operate with some level of independence as a subsidiary. The acquired organization may be valued for its customer goodwill and market segment share, and significant visible changes or wholesale integrations may be undesirable. Yet, some forms of consolidation between subsidiary and parent may be beneficial to reduce expenses. Further, the acquiring organization may have better or more secure computing systems, in an objective or subjective sense, and it may be beneficial to transition certain subsidiary operations to the parent. User identity systems are of particular importance from the security perspective, and the identity systems of the parent may be viewed as superior relative to the subsidiary in terms of staffing support, policy compliance, and investment.

Various embodiments of the present disclosure provide for a seamless migration of user identities from one organization to another, such as from a subsidiary to a parent. To effect a smooth transition, the user interfaces and other infrastructure of the subsidiary's network site may remain substantially the same after the migration, so that end users may not even be aware of the difference in identity systems being used. Also, the same usernames and security credentials may be employed after the migration in some scenarios.

Figure 1:
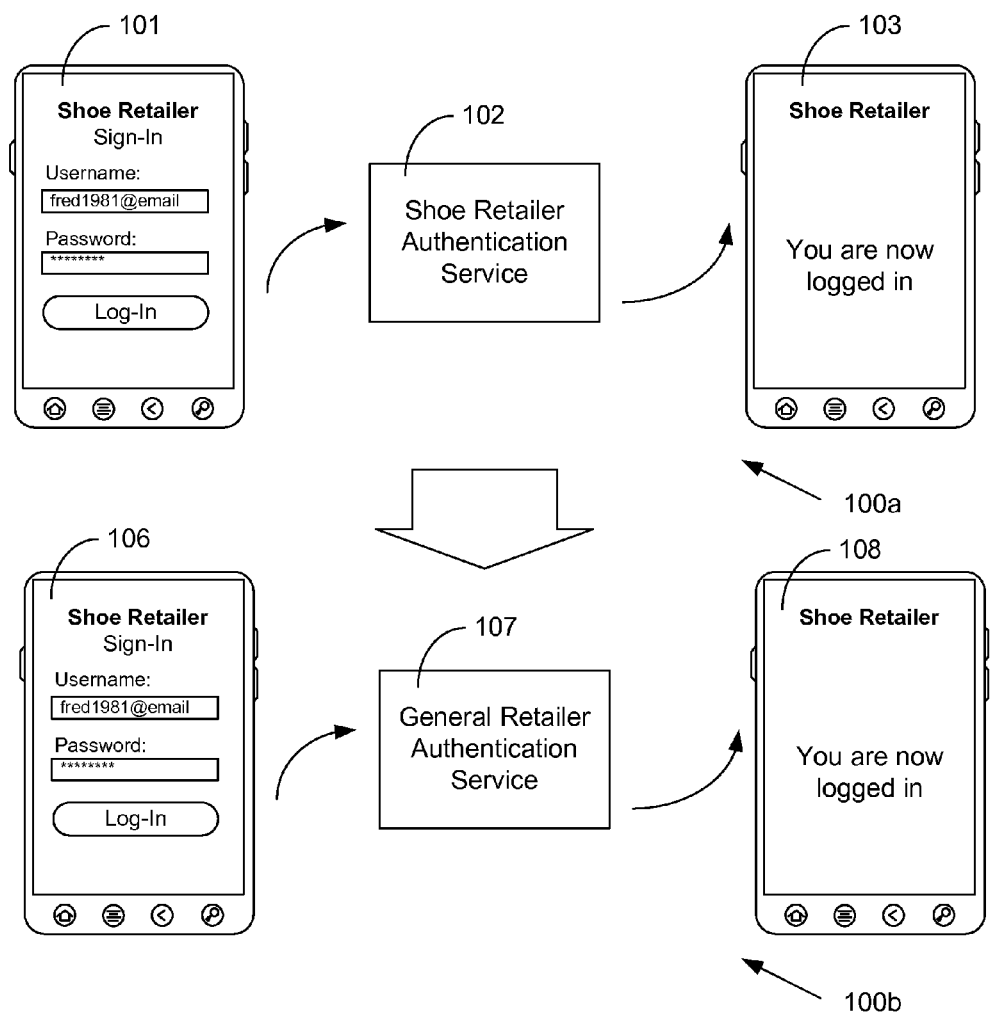
FIG. 1 is a drawing of two example scenarios representing a before and after comparison of identity migration through the operation of the present disclosure

Referring now to FIG. 1, shown is a drawing of two example scenarios 100a and 100b representing a before and after comparison of identity migration through the operation of the present disclosure. In the first scenario 100a, a user at a client device accesses a sign-in user interface of "Shoe Retailer" at step 101. The user inputs a username and password and selects "Log-In." The submitted username and password are then transmitted to an authentication service operated by "Shoe Retailer" at step 102. The client device may transmit the login information via a web form or through an application programming interface (API). Upon the authentication service performing verification that the submitted username and password are correct, the client device may at step 103 show a user interface that explains that the log-in was a success (or failure, as the case may be).

As will be explained in the present disclosure, the user identity data for "Shoe Retailer" may be migrated to systems of "General Retailer." "General Retailer" may, for example, be an organization that has acquired "Shoe Retailer." In the post-migration scenario 100b, the user at a client device at step 106 again accesses a sign-in user interface of "Shoe Retailer," which may appear identical to that shown in step 101. The user may enter the same username and password as before, as the underlying identity information has not changed. However, in step 107, an authentication service operated by "General Retailer" has replaced the authentication service operated by "Shoe Retailer." Nonetheless, in step 108, the user-facing result may be substantially identical as step 103. In the following discussion, a general description of the system and its components is provided, followed by a discussion of the operation of the same.

Figure 2:
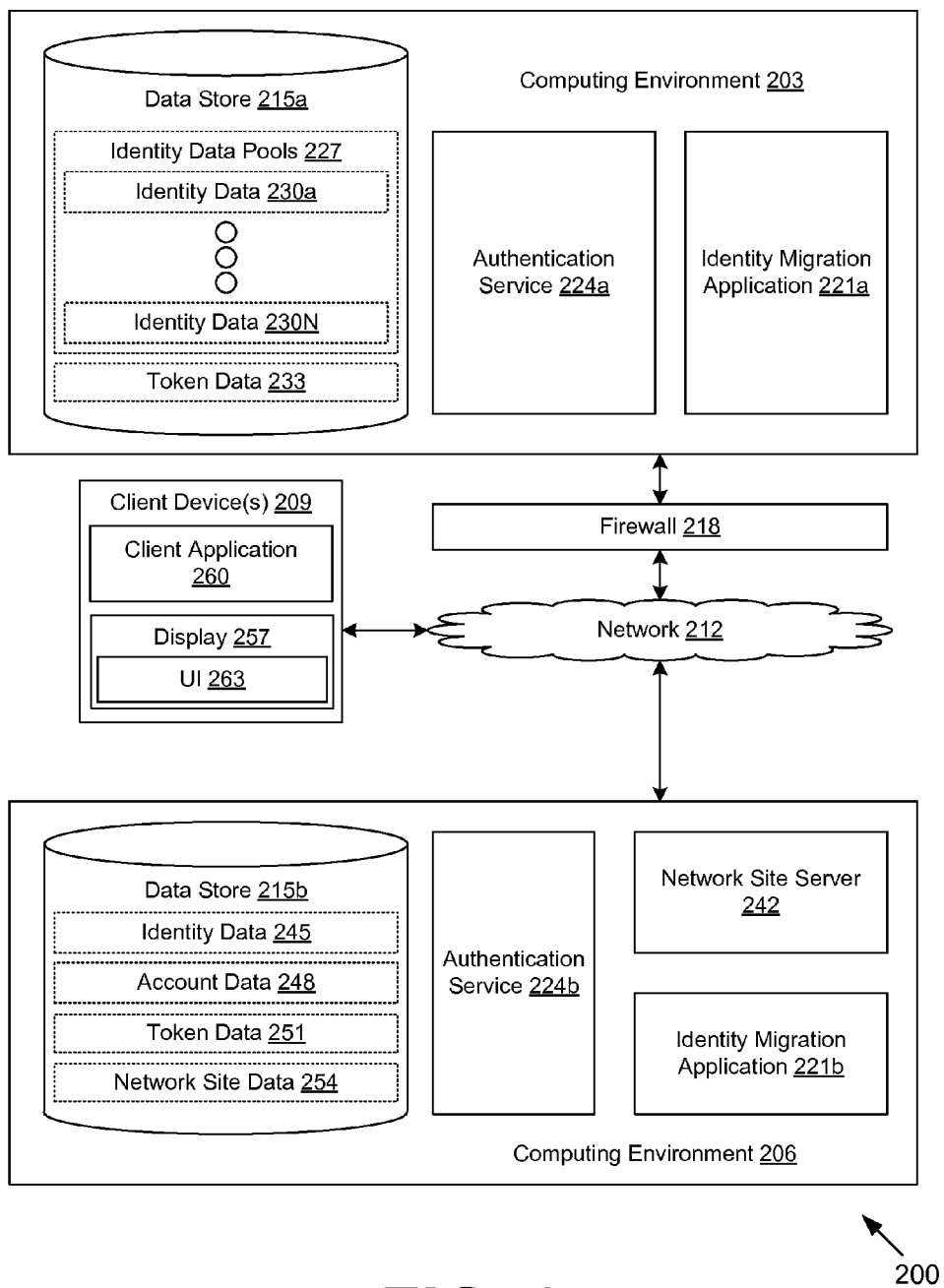
FIG. 2 is a schematic block diagram of a networked environment according to various embodiments of the present disclosure.

With reference to FIG. 2, shown is a networked environment 200 according to various embodiments. The networked environment 200 includes a computing environment 203, a computing environment 206, and one or more client devices 209, which are in data communication with each other via a network 212. The network 212 includes, for example, the Internet, intranets, extranets, wide area networks (WANs), local area networks (LANs), wired networks, wireless networks, cable networks, satellite networks, or other suitable networks, etc., or any combination of two or more such networks.

The computing environments 203 and 206 may each comprise, for example, a server computer or any other system providing computing capability. Alternatively, the computing environments 203 and 206 may employ a plurality of computing devices that may be arranged, for example, in one or more server banks or computer banks or other arrangements. Such computing devices may be located in a single installation or may be distributed among many different geographical locations. For example, the computing environments 203 and 206 may include a plurality of computing devices that together may comprise a hosted computing resource, a grid computing resource, and/or any other distributed computing arrangement. In some cases, the computing environments 203 and 206 may correspond to an elastic computing resource where the allotted capacity of processing, network, storage, or other computing-related resources may vary over time.

Various applications and/or other functionality may be executed in the computing environments 203 and 206 according to various embodiments. Also, various data is stored in a data store 215a and 215b that is accessible to the respective computing environments 203 and 206. The data stores 215a, 215b may be representative of a plurality of data stores 215a, 215b as can be appreciated. The data stored in the data store 215a, 215b for example, is associated with the operation of the various applications and/or functional entities described below.

The computing environment 206 is operated by a first organization that is migrating its user identities to a second organization. The computing environment 203 is operated by the second organization that is receiving the migration of user identities from the first organization. In one example, the first organization is a subsidiary of the second organization. In another example, the second organization may be a third-party identity provider.

The computing environment 203 may be separated from the computing environment 206 by way of a firewall 218. The firewall 218 is configured to filter incoming and/or outgoing traffic on the network 212 relative to the computing environment 203. For example, the firewall 218 may disallow access to the data store 215a by the computing environment 206. Although FIG. 2 includes a single firewall 218, it is understood that multiple different firewalls 218 may be used in some networked environments 100. Moreover, in some situations, another firewall 218 may be used to protect the computing environment 206 with respect to the network 212. Further, in other situations, a firewall 218 may be absent.

The components executed in the computing environment 203, for example, include an identity migration application 221a, an authentication service 224a, and other applications, services, processes, systems, engines, or functionality not discussed in detail herein. The identity migration application 221a is executed to facilitate migration of identity data from one organization to another. In addition, as part of the migration, the identity migration application 221a may be configured to transition a sign-in process of the first organization to invoke an authentication service 224a of the second organization to which the identity data has been migrated. In FIG. 2, two separate identity migration applications 221a and 221b are shown, representing components that are executed in both computing environments 203 and 206. However, in some cases, a single identity migration application 221 may be employed if it is given necessary access to both the computing environment 203 and the computing environment 206. The authentication service 224a is executed to facilitate authentication of users for the organization associated with the computing environment 203, and upon identity migration, users for the organization associated with the computing environment 206 as well.

The data stored in the data store 215a includes, for example, identity data pools 227 having a plurality of sets of identity data 230a . . . 230N, token data 233, and potentially other data. The identity data pools 227 may include identity data 230 for two or more different organizations. The sets of identity data 230 may be kept separate from each other, for example, so that a same username may be used for accounts represented by different sets of identity data 230. The identity data 230 may include username and security credentials as well as contact information and other personal information associated with users. In one embodiment, identity data 230 for different organizations may optionally be linked together so that a single identity is shared for accounts with different organizations.

Various portions of the identity data 230 may be stored in an encrypted form. For example, security credentials may be stored using public-key encryption. Alternatively, security credentials may be stored using a non-reversible encryption, such as a hashing algorithm. The token data 233 may include authentication tokens associated with identities that have been verified by way of the authentication service 224a. In some cases, the token data 233 may include session tokens generated for use with a network site to correlate session state across multiple client interactions.

The components executed in the computing environment 206, for example, include an identity migration application 221b, an authentication service 224b, a network site server 242, and other applications, services, processes, systems, engines, or functionality not discussed in detail herein. Similarly to the computing environment 203, the computing environment 206 may include an identity migration application 221b to facilitate identity migration as well as an authentication service 224b executed to facilitate authentication of users for the organization associated with the computing environment 206. The network site server 242 is executed to serve network pages and other data for a network site hosted by the computing environment 206. To this end, the network site server 242 may serve data via hypertext transfer protocol (HTTP), representational state transfer (REST), simple object access protocol (SOAP), or other protocols.

The data stored in the data store 215b includes, for example, identity data 245, account data 248, token data 251, and potentially other data. The identity data 245 corresponds to user identity information (e.g., usernames, security credentials, personal identifying information, etc.) that is to be migrated to the computing environment 203. The account data 248 may include various other information associated with user accounts beyond identity information. Such information may include purchase history, browse history, preferences, personalizations, and so on.

The token data 251 may include authentication tokens associated with identities that have been verified by way of the authentication service 224b. Also, the token data 251 may include session tokens generated for use with a network site hosted by the network site server 242 upon authentication by the authentication service 224a. The network site data 254 includes various data employed by the network site server 242 to serve up network pages and other data for a network site hosted by the network site server 242.

The client device 209 is representative of a plurality of client devices that may be coupled to the network 212. The client device 209 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices. The client device 209 may include a display 257. The display 257 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 209 may be configured to execute various applications such as a client application 260 and/or other applications. The client application 260 may be executed in a client device 209, for example, to access network content served up by the computing environments 203, 206 and/or other servers, thereby rendering a user interface 263 on the display 257. To this end, the client application 260 may comprise, for example, a browser, a dedicated application, etc., and the user interface 263 may comprise a network page, an application screen, etc. The client application 260 may be configured to access the network content via the web or via an API. Specifically, the client application 260 may communicate with the components executed by computing environments 203, 206 via HTTP, SOAP, REST, or any other protocol. In some cases such as with mobile applications, the client application 260 may simply render the user interface 263 on its own based upon data values received from a service call. The client device 209 may be configured to execute applications beyond the client application 260 such as, for example, email applications, social networking applications, word processors, spreadsheets, and/or other applications.

Although the discussion herein refers to the identity information of the computing environment 206 being migrated to the computing environment 203, in some scenarios, the identity information of the computing environment 203 may also be migrated. For example, a company that has previously acquired and subsidiaries and migrated their identity information may itself become acquired by another company. Thus, an acquiring company's identity information may later be migrated according to the principles of the present disclosure.

Figure 3:
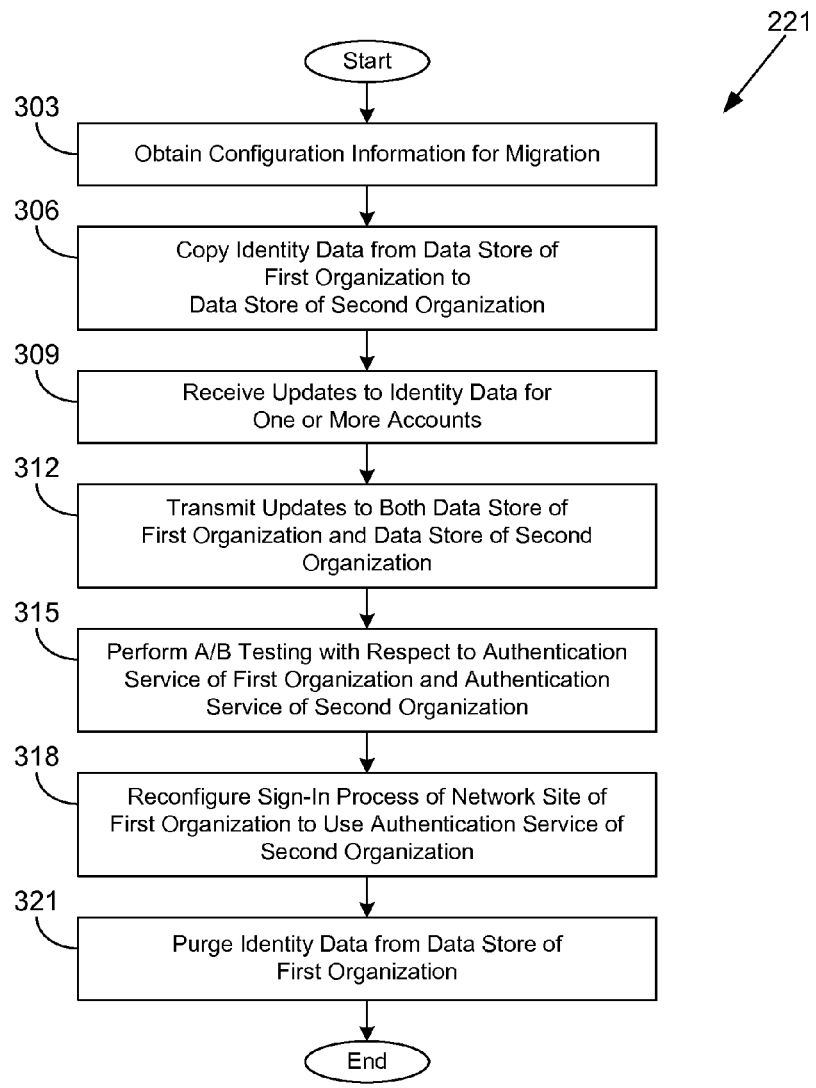
FIG. 3 is a flowchart illustrating one example of functionality implemented as portions of an identity migration application executed in a computing environment in the networked environment of FIG. 2 according to various embodiments of the present disclosure.

Referring next to FIG. 3, shown is a flowchart that provides one example of the operation of a portion of the identity migration application 221 according to various embodiments. It is understood that the flowchart of FIG. 3 provides merely an example of the many different types of functional arrangements that may be employed to implement the operation of the portion of the identity migration application 221 as described herein. As an alternative, the flowchart of FIG. 3 may be viewed as depicting an example of elements of a method implemented in the computing environment 203 and/or 206 (FIG. 2) according to one or more embodiments.

Beginning with box 303, the identity migration application 221 obtains configuration information for the identity migration process to migrate user identities from a first organization to a second organization. At the outset, the identity data 245 (FIG. 2) is stored by the first organization, and the authentication service 224b (FIG. 2) operated by the first organization is used to authenticate users accessing the network site of the first organization. The configuration information may then be used to perform the initial set up of the identity data 230 (FIG. 2) in the identity data pool 227 (FIG. 2) of the second organization. In addition, the configuration information may be used to configure hashing algorithm operation and/or other aspects of the computing environment 203 in order for the computing environment 203 to be prepared to process the identity data 230 and handle authentication.

In box 306, the identity migration application 221 initiates copying of the identity data 245 from the data store 215b (FIG. 2) of the first organization to the identity data pools 227 of the data store 215a (FIG. 2) of the second organization. This may execute as an off-line process or a background process. In some cases, the copying of the identity data 245 may encompass a manual procedure whereby the identity data 245 is transferred from the data store 215b to a computer-readable medium that is then transported and loaded onto the data store 215a. For instance, the identity data 245 may be bulk copied onto a hard drive and physically moved to the data center that hosts the data store 215a.

In box 309, the identity migration application 221 receives updates to identity data 245 for one or more user accounts. For example, a user may create a new account, change contact information, change a password, or perform other tasks that result in an update to the identity data 245. Given that the migration process may take some time to complete, it may be undesirable to disallow updates during the migration process. Thus, an on-line process may also be used for the migration. In box 312, the identity migration application 221 transmits the updates to both the data store 215a and the data store 215b to maintain consistency. In other embodiments, the identity migration application 221 is not directly involved in receiving the updates and transmitting them. That is to say, the identity migration application 221 may simply configure another component that receives the updates to transmit them to both the data store 215b and the data store 215a, rather than to the data store 215b alone. Alternatively, the updates may be copied after they are stored by the data store 215b.

In copying the identity data 245 and updates to the data store 215a, the identity data 245 may be processed so that it is in a correct format for the authentication service 224a (FIG. 2). In one example, the identity data 245 may be decrypted and then encrypted using a key and/or algorithm employed by the authentication service 224a. Alternatively, the identity migration application 221 may configure the authentication service 224a to support a format of the identity data 245. For example, the authentication service 224a may be configured to support a particular hashing algorithm used to store security credentials in the identity data 245.

Before the identity migration process is complete and fully in production, it may be desired to perform some type of testing. Predetermined test cases may be executed to discover any transcoding discrepancies via isolated testing. Shadow mode testing may then be performed. For example, in box 315, the identity migration application 221 performs NB testing with respect to the authentication service 224b of the first organization and the authentication service 224a of the second organization. To illustrate, whenever a user authenticates against the authentication service 224b of the first organization, the same request is also sent to the authentication service 224a of the second organization as well. The responses from both the authentication service 224a and the authentication service 224b may be compared and plotted to identify a consistency discrepancy level. A goal of this testing may be to ensure that the behavior of the authentication service 224*a* mirrors that of the authentication service 224*b* by correctly verifying login information presented by registered users.

In box 318, the identity migration application 221 reconfigures the sign-in process of the network site of the first organization to use the authentication service 224*a* in place of the authentication service 224*b*. The actual reconfiguration may be performed at a time of low utilization to minimize impacts. The reconfigured network site may use hypertext transfer protocol (HTTP)-based redirection to the second organization for web-based interaction, and/or an internal proxy where the first organization still receives the request and then forwards it to the second organization via an application programming interface (API) call. In box 321, the identity migration application 221 may purge the identity data 245 from the data store 215*b*, which may thereby reduce potential security liabilities for the first organization. Thereafter, the portion of the identity migration application 221 ends.

Figure 4:
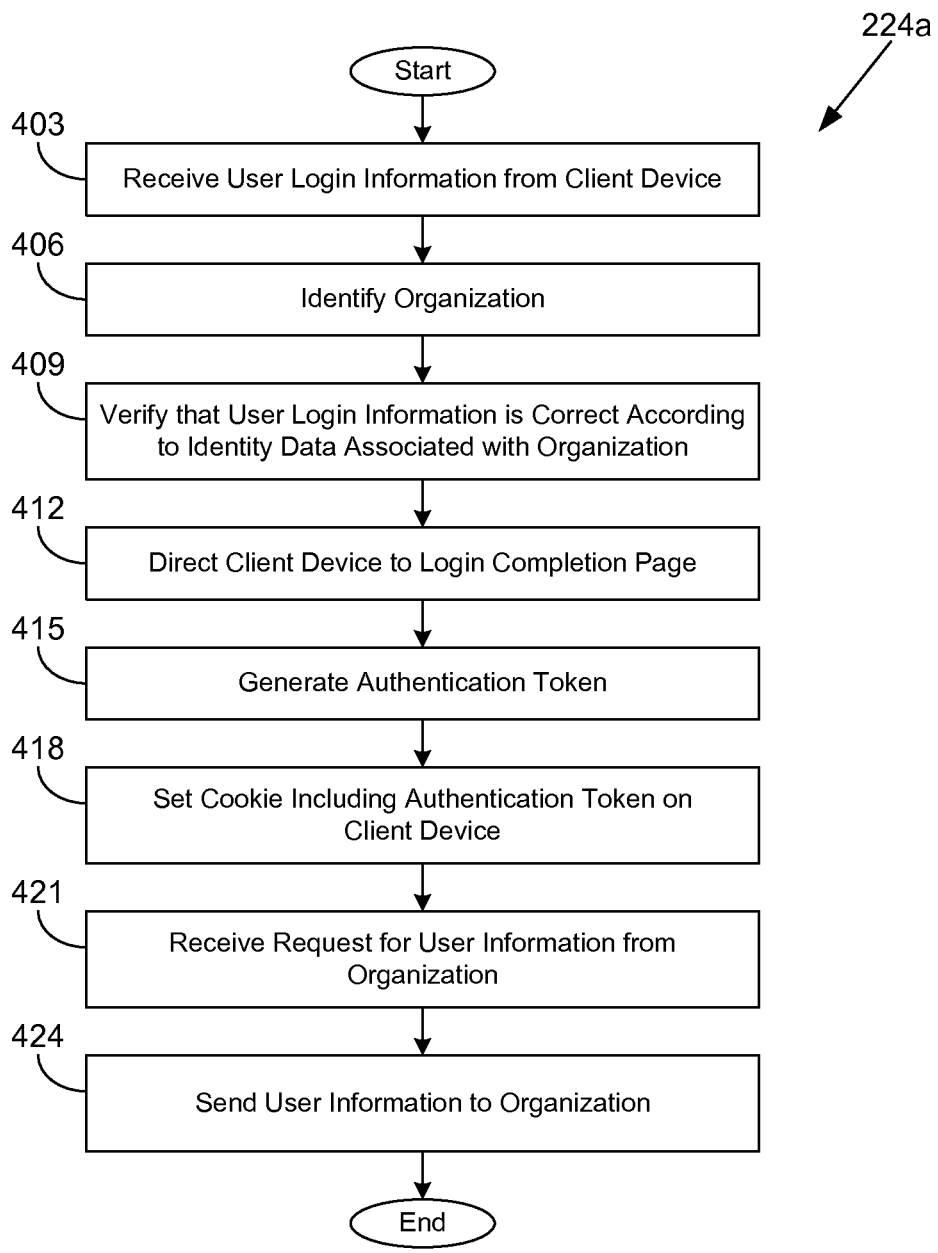
FIG. 4 is a flowchart illustrating one example of functionality implemented as portions of an authentication service executed in a computing environment in the networked environment of FIG. 2 according to various embodiments of the present disclosure.

Moving on to FIG. 4, shown is a flowchart that provides one example of the operation of a portion of the authentication service 224*a* post-identity migration according to various embodiments. It is understood that the flowchart of FIG. 4 provides merely an example of the many different types of functional arrangements that may be employed to implement the operation of the portion of the authentication service 224*a* as described herein. As an alternative, the flowchart of FIG. 4 may be viewed as depicting an example of elements of a method implemented in the computing environment 203 (FIG. 2) according to one or more embodiments.

Beginning with box 403, the authentication service 224*a* receives user login information from a client device 209 (FIG. 2). For example, the user at the client device 209 may employ the client application 260 (FIG. 2) to access network resources served by the network site server 242 (FIG. 2). Such network resources may comprise network pages or network data to be rendered by the client application 260. The client application 260 then renders a form to collect the user login information, e.g., username and password, and then submits the user login information to the authentication service 224*a*. In other examples, the authentication service 224*a* may support multi-factor authentication, requiring additional factors such as one-time passwords, biometric identifiers, etc.

In box 406, the authentication service 224*a* identifies an organization for which the authentication is to be performed. The uniform resource locator (URL) used to submit the user login information may be customized for the organization, and thereby an association with the organization may be determined. Alternatively, a referring URL may be determined, and a domain or other identifier in the URL may identify the organization.

In box 409, the authentication service 224*a* verifies that the user login information is correct according to identity data 230 (FIG. 2) associated with the organization. For example, the authentication service 224*a* may perform a hashing operation on a password received from the user, and then compare the hashed password with a stored password associated with the supplied username in the identity data 230. If the login information is correct, the authentication service 224*a* may direct the client device 209 to a login completion page in box 412. In box 415, the authentication service 224*a* may generate an authentication token that indicates that the user has been authenticated. In box 418, the authentication service 224*a* may set a cookie that includes the authentication token upon the client device 209 via the login completion page. In some embodiments, the authentication service 224*a* may also return additional metadata such as subscription status, customer identifier, etc., which may be placed in a cookie. Alternatively, rather than using a cookie, the authentication token and/or the additional metadata may be returned as parameters embedded in the login completion page.

Subsequently, after the authentication service 224*b* as confirmed that the user is authenticated by way of the authentication token, in box 421, the authentication service 224*a* may receive a request for information about the user from the network site server 242 (FIG. 2) of the organization. The request may specify the authentication token and/or another long-lived credential. The request may be for identifying data such as name, customer identifier, subscription status, program participation, etc., so that the network site server 242 can correlate the session with other account data 248 (FIG. 2). In box 424, the authentication service 224*a* sends the requested user information to the network site server 242. The user information may be persisted in the account data 248 in order to keep a local copy refreshed for the network site server 242. Also, an off-line synchronization process may be used to refresh the user information of the account data 248. Thereafter, the portion of the authentication service 224*a* ends.

Figure 5:
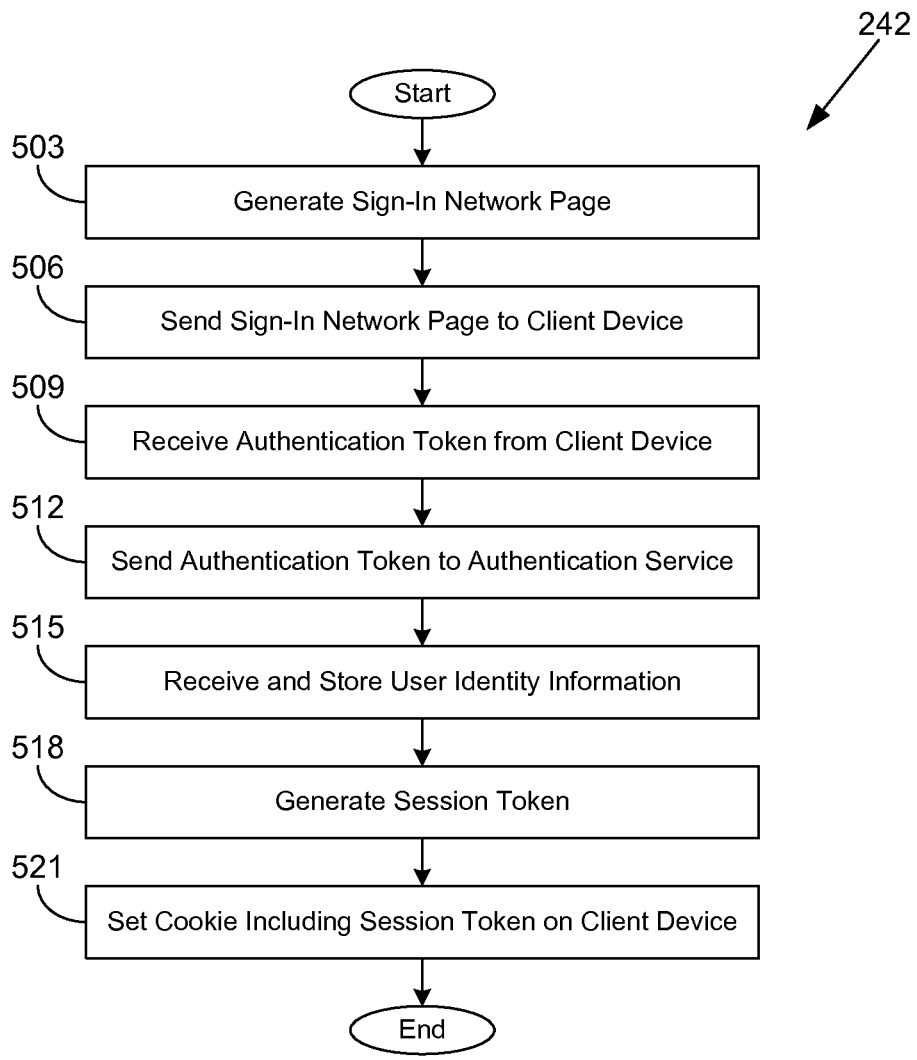
FIG. 5 is a flowchart illustrating one example of functionality implemented as portions of a network site server executed in a computing environment in the networked environment of FIG. 2 according to various embodiments of the present disclosure.

Continuing to FIG. 5, shown is a flowchart that provides one example of the operation of a portion of the network site server 242 according to various embodiments. It is understood that the flowchart of FIG. 5 provides merely an example of the many different types of functional arrangements that may be employed to implement the operation of the portion of the network site server 242 as described herein. As an alternative, the flowchart of FIG. 5 may be viewed as depicting an example of elements of a method implemented in the computing environment 206 (FIG. 2) according to one or more embodiments.

Beginning with box 503, the network site server 242 generates a sign-in network page. In box 506, the network site server 242 sends the sign-in network page to the client device 209 (FIG. 2). In box 509, after the client device 209 has authenticated with the authentication service 224*a* (FIG. 2), the client device 209 presents an authentication token to the network site server 242. The network site server 242 may verify that the authentication token is correct.

In box 512, the network site server 242 submits the authentication token to the authentication service 224*a*. In box 515, the network site server 242 receives a portion of the user identity information, e.g., name, metadata, etc., from the authentication service 224*a*. The network site server 242 may then generate a session token in box 518. In box 521, the network site server 242 may set a cookie including the session token on the client device 209. The client device 209 may subsequently present the session token to the network site server 242 for all further interactions with the network site, which will then recognize the authenticated session for the client device 209. Thereafter, the portion of the network site server 242 ends.

Figure 6:
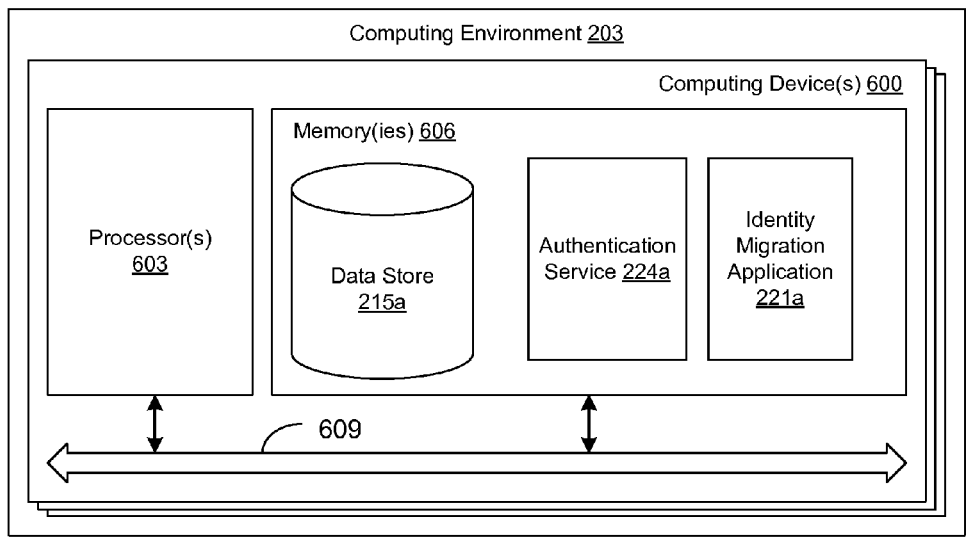
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated. The computing environment 206 (FIG. 2) may be structured similarly to the computing environment 203.

Stored in the memory 606 are both data and several components that are executable by the processor 603. In particular, stored in the memory 606 and executable by the processor 603 are the authentication service 224a, the identity migration application 221a, and potentially other applications. Also stored in the memory 606 may be a data store 215a and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the authentication service 224a, the identity migration application 221a, the network site server 242 (FIG. 2), the authentication service 224b (FIG. 2), the identity migration application 221b (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the identity migration application 221, the authentication service 224a, and the network site server 242. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication service 224a, the identity migration application 221a, the network site server 242, the authentication service 224b, and the identity migration application 221b, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the authentication service 224a, the identity migration application 221a, the network site server 242, the authentication service 224b, and the identity migration application 221b, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:

copy identity data corresponding to a plurality of user accounts of a first organization from a first data store managed by the first organization to a second data store managed by a second organization;

in response to receiving an update to the identity data for one of the plurality of user accounts, transmit the update to both the first data store and the second data store;

perform A/B testing with respect to a first authentication service operated by the first organization and a second authentication service operated by the second organization, the first authentication service being configured to authenticate a user using the identity data stored in the first data store, the second authentication service being configured to authenticate the user using the identity data stored in the second data store, the A/B testing comprising verifying an identity authentication process by comparing a first authentication response from the first authentication service and a second authentication response from the second authentication service;

reconfigure a sign-in process of a network site of the first organization to employ the second authentication service in place of the first authentication service, wherein reconfiguring the sign-in process is performed when the sign-in process fails to exceed a utilization threshold; and purge the identity data stored from the first data store, wherein servers implementing the second authentication service are separated from servers hosting the network site by a firewall.

2. The non-transitory computer-readable medium of claim 1, wherein the identity data includes a respective username and a respective hashed security credential for individual ones of the plurality of user accounts.

3. The non-transitory computer-readable medium of claim 1, wherein in response to authenticating the user, the second authentication service is configured to transmit a portion of the identity data that is associated with the user to the network site.

4. The non-transitory computer-readable medium of claim 1, wherein reconfiguring the sign-in process comprises using a hypertext transfer protocol (HTTP)-based redirection to redirect an authentication request from the first authentication service operated by the first organization to the second authentication service operated by the second organization.

5. A system, comprising:

at least one computing device; and at least one application executable in the at least one computing device, wherein when executed the at least one application causes the at least one computing device to at least:

copy identity data corresponding to a plurality of user accounts of a first organization from a first data store managed by the first organization to a second data store managed by a second organization;

in response to receiving an update to the identity data for one of the plurality of user accounts, transmit the update to both the first data store and the second data store;

perform A/B testing with respect to a first authentication service operated by the first organization and a second authentication service operated by the second organization, the first authentication service being configured to authenticate a user using the identity data stored in the first data store, the second authentication service being configured to authenticate the user using the identity data stored in the second data store, the A/B testing comprising verifying an identity authentication process by comparing a first authentication response from the first authentication service and a second authentication response from the second authentication service;

reconfigure a sign-in process of a network site of the first organization to employ the second authentication service operated by the second organization in place of the first authentication service, wherein reconfiguring the sign-in process is performed when the sign-in process fails to exceed a utilization threshold; and purge the identity data stored from the first data store, wherein servers implementing the second authentication service are separated from servers hosting the network site by a firewall.

6. The system of claim 5, wherein the reconfigured sign-in process uses hypertext transfer protocol (HTTP)-based redirection to redirect an authentication request from the first authentication service operated by the first organization to the second authentication service operated by the second organization.

7. The system of claim 5, wherein the reconfigured sign-in process uses a proxy to forward an authentication request received by the first authentication service operated by the first organization to the second authentication service operated by the second organization.

8. The system of claim 5, wherein when executed the at least one application further causes the at least one computing device to at least configure the second authentication service to employ a hashing algorithm employed by the first authentication service to compare a user-provided security credential with a hashed security credential in the identity data.

9. The system of claim 5, wherein the network site is hosted by at least one first server on a first network operated by the first organization, the second authentication service is hosted by at least one second server on a second network operated by the second organization, and the first network and the second network are separated by a firewall.

10. The system of claim 5, wherein the second data store is configured to store the identity data of the first organization separately from existing identity data of the second organization.

11. The system of claim 5, wherein the second authentication service is configured to return an authentication token to the network site in response to authenticating the user.

12. The system of claim 11, wherein, in response to receiving the authentication token, the network site is configured to request identifying information about the user from the second authentication service based at least in part on the authentication token.

13. The system of claim 11, wherein the second authentication service is further configured to return user metadata to the network site along with the authentication token.

14. A method, comprising:

copying, via at least one of one or more computing devices, identity data corresponding to a plurality of user accounts of a first organization from a first data store managed by the first organization to a second data store managed by a second organization;

receiving, via at least one of the one or more computing devices, an update to the identity data for one of the plurality of user accounts, transmitting, via at least one of the one or more computing devices, the update to both the first data store and the second data store;

performing, via at least one of the one or more computing devices, A/B testing with respect to a first authentication service operated by the first organization and a second authentication service operated by the second organization, the first authentication service being configured to authenticate a user using the identity data stored in the first data store, the second authentication service being configured to authenticate the user using the identity data stored in the second data store, the A/B testing comprising verifying an identity authentication process by comparing a first authentication response from the first authentication service and a second authentication response from the second authentication service;

reconfiguring, via at least one of the one or more computing devices, a sign-in process of a network site of the first organization to employ the second authentication service operated by the second organization in place of the first authentication service, wherein reconfiguring the sign-in process is performed when the sign-in process fails to exceed a utilization threshold; and purging, via at least one of the one or more computing devices, the identity data stored from the first data store, wherein servers implementing the second authentication service are separated from servers hosting the network site by a firewall.

15. The method of claim 14, wherein the first authentication service is configured to return an authentication token to the network site in response to authenticating the user.

16. The method of claim 14, wherein the second data store is configured to store the identity data of the first organization separately from existing identity data of the second organization.

17. The method of claim 14, wherein the comparison is used to determine a consistency discrepancy level between the first authentication service and the second authentication service.

18. The method of claim 14, wherein the update comprises at least one of a creation of a new account, a change of contact information, or a change of a password.

* * * * *